No. 861,288. PATENTED JULY 30, 1907.
E. H. JOHNSON.
TROLLEY WHEEL.
APPLICATION FILED OCT. 8, 1906.
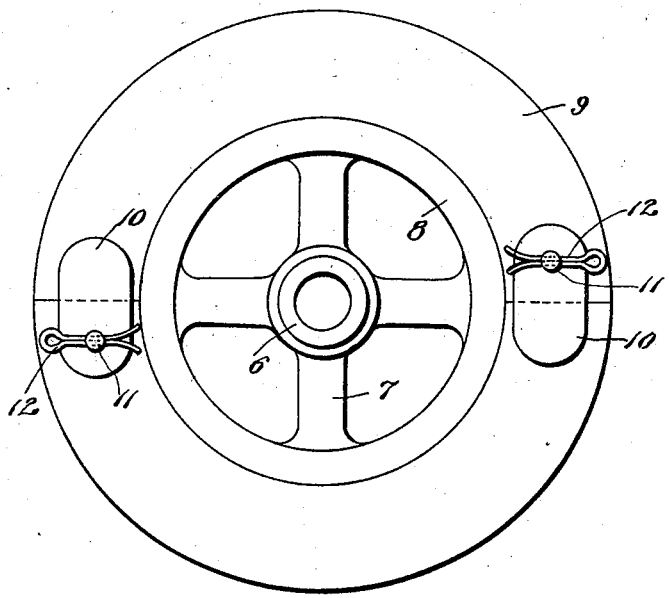
Fig. 1.
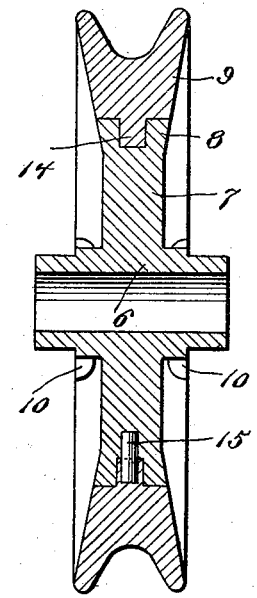
Fig. 2.
Fig. 3.
Edward H. Johnson
Inventor
Witnesses
M. Schmidt
Geo. E. Tew
By Milo B. Stevens & Co.
Attorneys.

UNITED STATES PATENT OFFICE.

EDWARD H. JOHNSON, OF CLEVELAND, OHIO.

TROLLEY-WHEEL.

No. 861,288.      Specification of Letters Patent.      Patented July 30, 1907.

Application filed October 8, 1906. Serial No. 337,979.

*To all whom it may concern:*

Be it known that I, EDWARD H. JOHNSON, a citizen of the United States, residing at Cleveland, in the county of Cuyahoga and State of Ohio, have invented new and useful Improvements in Trolley-Wheels, of which the following is a specification.

This invention relates to trolley wheels adapted for use on electric railways and has for its object to provide a sectional wheel the rim of which can be renewed without throwing away or wasting the whole wheel, and also which can be renewed without taking the wheel off the pole.

At the present time, when a solid wheel becomes so worn that it has to be removed, the trolley pole has to be taken off of the car and into the repair shop, and the wheel taken out of its bearings in the harp. If the wheel is so badly worn that it cannot be turned up, it has to be discarded and a new wheel put in its place. This takes considerable time and expense.

With the present invention, the removal of the wheel is unnecessary, inasmuch as the worn rim can be renewed by removing pins which hold the rim-sections together, taking off the old sections and replacing new ones. This operation can be done in a very few minutes, and all the tools needed is a pair of pliers.

Another feature is the reduced cost incident to the invention. Heretofore, the whole wheel, which is generally cast in solid brass, had to be thrown away at a great expense. With this present invention the hub and central part of the wheel can be made of much cheaper metal than brass, and can be used to wear out any number of the more valuable brass rims.

The invention is illustrated in the accompanying drawings in which

Figure 1 is a side elevation of the wheel. Fig. 2 is a central cross section.

The central part of the wheel is cast or made in one piece, consisting of a hub 6, spokes 7 and an inner ring or rim 8. The outer or main rim is made in two sections 9 which meet on a diametrical line, to form a ring which fits upon the inner ring 8. The outer rim is grooved as usual to receive the trolley wire. The sections 9 are joined by means of ears 10 extending on each side of the rim at the ends of the sections and adapted to lap the joint, and are fastened by means of pins 11, which extend through holes in the ears and in the rim-section therebetween. The pins are provided with cotters 12 to hold them in.

To prevent lateral displacement of the outer rim with respect to the central part of the wheel, the inner rim 8 has a circumferential groove which receives an inner circumferential rib or tongue 14 on the outer rim-sections 9. This prevents the outer rim from coming off. To prevent relative rotation of the central structure and the outer rim, the former is provided with a radial pin 15 located in the groove, which pin projects into a hole made to receive it in the rib 14. Accordingly all parts of the wheel must turn together.

Obviously, the rim-sections 9 can be removed when they become worn, by taking out the pins, and new sections can be put into place, and this can be done without removing the wheel from the trolley head.

I claim:—

A trolley wheel comprising a central structure having an inner rim with a circumferential groove around the same, an outer rim thereon formed of separable sections and an inner rib fitting in the groove and an outer circumferential groove to receive the wire, integral ears extending at each side of the ends of the sections, across the joints therebetween, pins extending through the ears and the ends of the sections therebetween, and means to prevent relative rotation of the rims.

In testimony whereof I have signed my name to this specification in the presence of two subscribing witnesses.

EDWARD H. JOHNSON.

Witnesses:
    JOHN A. BOMMHARDT,
    SHIRLEY J. BOMMHARDT.